US012766533B2

(12) United States Patent
Ritter

(10) Patent No.: US 12,766,533 B2
(45) **Date of Patent: *Oct. 20, 2026**

(54) HAND-HELD PAINT SPRAYER

(71) Applicant: J. WAGNER GmbH, Markdorf (DE)

(72) Inventor: Tino Ritter, Bermatingen (DE)

(73) Assignee: J. WAGNER GmbH, Markdorf (DE)

( * ) Notice: Subject to any disclaimer, the term of this patent is extended or adjusted under 35 U.S.C. 154(b) by 230 days.

This patent is subject to a terminal disclaimer.

(21) Appl. No.: 18/577,524

(22) PCT Filed: Jul. 28, 2022

(86) PCT No.: PCT/EP2022/071165

§ 371 (c)(1),
(2) Date: Jan. 8, 2024

(87) PCT Pub. No.: WO2023/006862

PCT Pub. Date: Feb. 2, 2023

(65) Prior Publication Data

US 2024/0335846 A1 Oct. 10, 2024

(30) Foreign Application Priority Data

Jul. 30, 2021 (DE) ......................... 102021119883.6

(51) Int. Cl.
*B05B 7/24* (2006.01)
*B05B 7/00* (2006.01)

(52) U.S. Cl.
CPC .......... *B05B 7/2416* (2013.01); *B05B 7/0081* (2013.01)

(58) Field of Classification Search
CPC ....... B05B 7/02; B05B 7/0075; B05B 7/0081; B05B 7/064; B05B 7/0815
(Continued)

(56) References Cited

U.S. PATENT DOCUMENTS 7,303,149 B1 12/2007 Huang
9,975,129 B2 5/2018 Göhring et al.
(Continued)

FOREIGN PATENT DOCUMENTS

CN 112004608 A 11/2020
DE 102004027551 A1 1/2006
(Continued)

OTHER PUBLICATIONS

International Search Report Written Opinion for PCT Application No. PCT/EP2022/071165, dated Oct. 21, 2022, 20 pages including English translation.

(Continued)

*Primary Examiner* — Jason J Boeckmann
(74) *Attorney, Agent, or Firm* — Christopher J. Volkmann; KELLY, HOLT & CHRISTENSON PLLC

(57) ABSTRACT

A hand-held paint sprayer includes a housing having a handle, a spray head, a fan motor. The hand-held paint sprayer includes a receptacle space for the fan motor. The receptacle space includes an air inlet and an air outlet. The receptacle space is configured as a pressurized chamber. The pressurized chamber, in addition to a first opening formed by the air inlet and a second opening formed by the air outlet, comprises a third opening which is in particular disposed opposite the first opening.

16 Claims, 12 Drawing Sheets

(58) Field of Classification Search
USPC .......................................................... 239/526
See application file for complete search history.

(56) References Cited

U.S. PATENT DOCUMENTS

| | | | | |
|---|---|---|---|---|
| 10,293,351 | B2 * | 5/2019 | Krayer .................. | B05B 7/2467 |
| 10,654,055 | B1 * | 5/2020 | Alonso ................ | B65D 83/182 |
| 2005/0269425 | A1 | 12/2005 | Göhring et al. | |
| 2014/0339329 | A1 | 11/2014 | Lawrence et al. | |
| 2022/0274123 | A1 | 9/2022 | Sun et al. | |
| 2024/0246098 | A1 * | 7/2024 | Ritter .................... | B05B 7/2416 |

FOREIGN PATENT DOCUMENTS

| | | | |
|---|---|---|---|
| DE | 102016107465 | A1 | 10/2017 |
| WO | 2021098781 | A1 | 5/2021 |

OTHER PUBLICATIONS

Office Action for European Patent Application No. 102021119883.6, dated Feb. 15, 2022, 5 pages.
International Preliminary Report on Patentability for PCT Application No. PCT/EP2022/071165, dated Jan. 18, 2024, 9 pages.
Search Report and Written Opinion for European Application No. PCT/EP2022/071165, dated Jul. 28, 2022, 16 pages.
Office Action for German Patent Application No. 10 2021 119 883.6, dated Feb. 15, 2022, 5 pages.
First Office Action for Chinese Application No. 202280051927.0, mailed Oct. 24, 2025, 10 Pages.

* cited by examiner

HAND-HELD PAINT SPRAYER

CROSS-REFERENCES TO RELATED APPLICATION

This Application is a Section 371 National Stage Application of International Application No. PCT/EP2022/071165, filed Jul. 28, 2022, and published as WO 2023/006862 A1 on Feb. 2, 2023, and claims priority to German Application No. 102021119883.6, filed Jul. 30, 2021; the contents of these applications are hereby incorporated by reference in their entirety.

DETAILED DESCRIPTION

Figure 1:
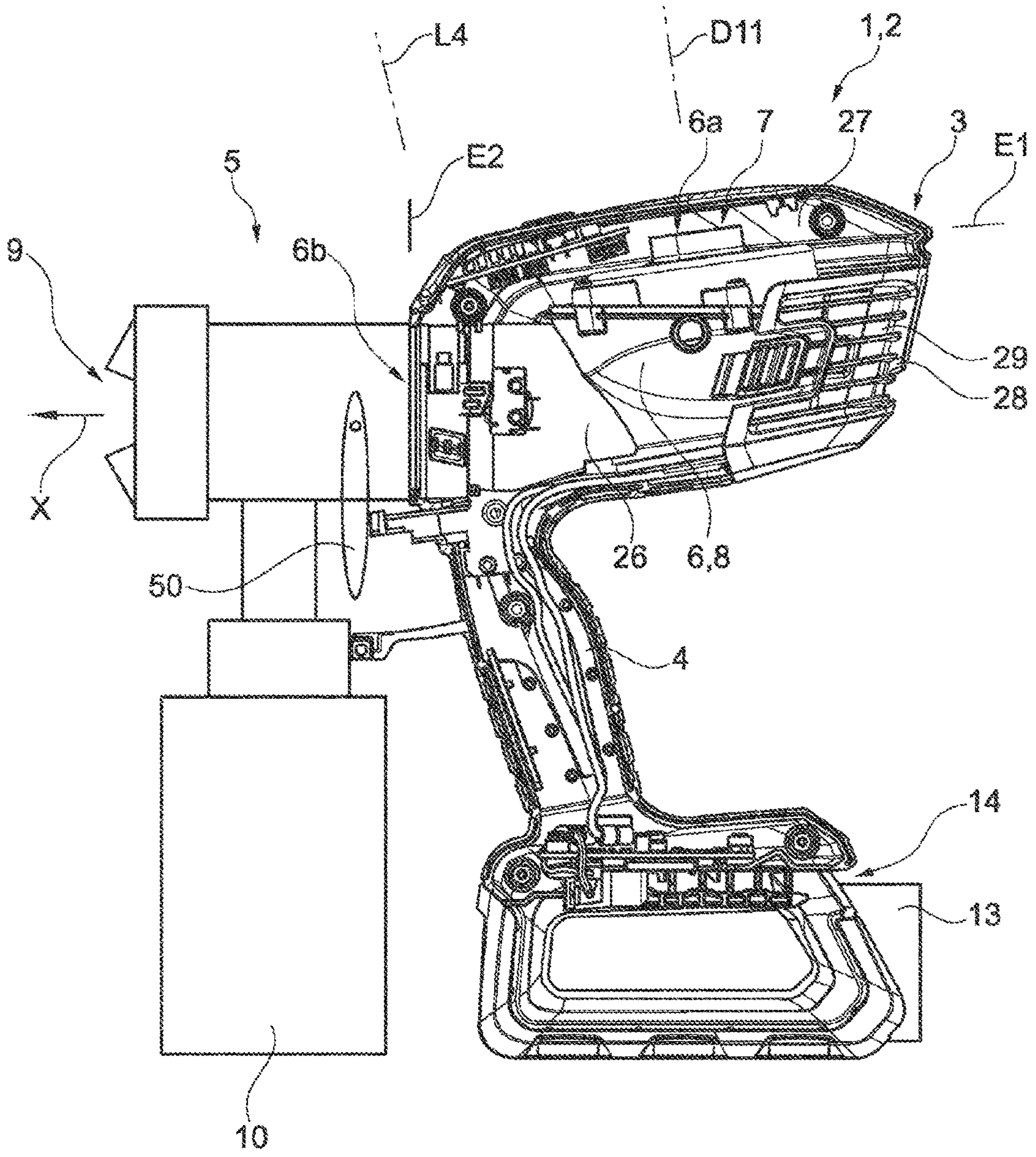
FIG. 1 shows a partially sectional and partially schematic lateral view of a hand-held paint sprayer according to one example.

The present disclosure relates to a hand-held paint sprayer.

Known from DE 10 2016 107 465 A1 is a hand-held paint sprayer which comprises a housing having a handle, a spray head and a fan motor, wherein the paint sprayer has a receptacle space for the fan motor, and wherein the receptacle space comprises an air inlet and an air outlet.

The present disclosure is based on an object of developing an improved hand-held paint sprayer.

Proceeding from the features of the preamble of claim 1, this object is achieved by the characterizing features of claim 1. Advantageous and expedient refinements are set forth in the dependent claims.

The hand-held paint sprayer according to one example comprises a housing having a handle, a spray head and a fan motor, wherein the paint sprayer comprises a receptacle space for the fan motor; wherein the receptacle space comprises an air inlet and an air outlet; wherein the receptacle space is configured as a pressurized chamber; and wherein the pressurized chamber—in addition to a first opening formed by the air inlet and a second opening formed by the air outlet—is equipped with a third opening which is in particular disposed opposite the first opening. A discharge of heat from the control circuit board out of the pressurized chamber is possible as a result of an opening of this type.

It is furthermore provided that the receptacle space is configured in such a manner that a first plane, in which lies a cross-sectional area of the air inlet, and a second plane, in which lies a cross-sectional area of the air outlet, intersect approximately orthogonally and herein are in particular at a mutual angle between 70° and 110°, and wherein the air outlet opens toward the spray head. It has been demonstrated in experiments that an arrangement of this type of the air inlet solely causes a reduction in the noise emissions of the spray painter acting on a user of the paint spray gun, while not affecting the output of the paint sprayer.

It is also provided that the third opening is closed by a control circuit board. As a result, the function of the pressurized chamber is maintained despite the presence of a third opening.

It is furthermore also provided that the pressurized chamber is equipped with a seal ring, wherein the seal ring is disposed on an internal side of the pressurized chamber in such a manner that said sealing ring encircles the third opening. Sealing the pressurized chamber using a planar element is possible as a result.

It is also provided that the fan motor, conjointly with the control circuit board fastened thereto, is installed in an interior space of the pressurized chamber in such a manner that the control circuit board bears on the seal ring and closes the third opening in a sealing manner, wherein it is provided in particular that the control circuit board comprises a connecting cable which is routed via the third opening into the handle. As a result, the pressurized chamber is reliably sealed in relation to air flowing out of the third opening. Furthermore, it is avoided as a result that a further cutout for a power supply and a communications link of the fan motor has to be provided on the pressurized chamber.

It is also provided that the pressurized chamber is configured in two parts, wherein an upper shell of the pressurized chamber receives in a form-fitting manner a fan housing and is screwed to a lower shell of the pressurized chamber in such a manner that the control circuit board is pressed against the seal ring in the region of the third opening. As a result, only one connection between the upper shell and the lower shell is required for fastening and positioning the fan motor.

It is furthermore provided that the fan motor by way of its rotation axis is aligned eccentrically in relation to a central axis of a motor receptacle region of the pressurized chamber. As a result, the space conditions in the pressurized chamber can be influenced in such a manner that these facilitate an outflow of the air, which is exhausted by the fan motor at the air outlet, in the direction of the second opening of the pressurized chamber.

It is also provided that a flow chamber is configured below the fan between the electric drive and an internal side of the pressurized chamber, wherein a spacing measured radially to the rotation axis of the electric drive between the electric drive and the internal side of the pressurized chamber, proceeding from a rear wall opposite the second opening of the pressurized chamber, increases on both sides of the electric drive in such a manner that the flow chamber toward the second opening is configured as a first flow duct, which widens on a left side of the electric drive, and as a second flow duct, which widens on a right side of the electric drive, for air conveyed by the fan, wherein the left flow duct and the right flow duct transition into a collective duct which leads to the second opening. As a result, the space conditions in the pressurized chamber can furthermore be influenced in such a manner that these facilitate an outflow of the air, which is exhausted by the fan motor at the air outlet, in the direction of the pressurized chamber.

It is also provided that the housing is equipped with a handle, wherein a longitudinal axis, which is defined by the handle, and a rotation axis of the fan motor are aligned so as to be approximately parallel to one another. A paint sprayer which is particularly compact in terms of its construction length can be produced as a result of the fan motor being diagonally installed in this manner.

It is finally provided that the third opening is configured as an opening which is semicircular in the cross section. As a result, an anti-tamper device which protects the control circuit board is achieved without the use of additional components.

It is furthermore provided that the fan motor comprises the electric drive and the fan, wherein it is also provided in particular that the paint sprayer is equipped with a power accumulator, and wherein it is also provided in particular that the handle, proximal to the end opposite the housing, is equipped with a coupling for mechanically and electrically coupling the power accumulator. Assembling of the paint sprayer is possible in a few steps as a result of a fan motor of this type, which forms a module.

It is also provided that the electric drive is configured as a brushless DC electric drive, also referred to as BLDC electric drive, which comprises the control circuit board connected to a motor housing; wherein the control circuit board is disposed opposite the fan. Assembling of the paint sprayer is furthermore facilitated as a result of the fan motor being configured with an electric drive of this type, because separate assembling of the control circuit board is dispensed with. It is furthermore ensured in conjunction with the features of claim 1 that any impediment of the air flow by the control circuit board is avoided, despite the latter being disposed on the motor housing.

It is furthermore provided that a/the fan driven by the electric drive is equipped with a/the fan housing, wherein an intake duct of the fan housing is passed through by a flow of induction air in the direction of a rotation axis of the electric drive; that the fan housing is equipped with an exhaust duct which is passed through by a flow of exhaust air in the direction of the rotation axis of the electric drive and has an annular cross section; and that the fan is equipped with a fan wheel which is received in the fan housing and is in particular configured as a radial fan wheel. A compact construction of the fan motor, which is adapted to the electric drive, is possible as a result of the fan being configured in such a manner.

It is also provided that the receptacle space is formed by the pressurized chamber, wherein the pressurized chamber is received in the interior space of the housing, and wherein a cavity is configured between the pressurized chamber and the housing. As a result, the housing does not have to assume the function of a pressurized chamber and can in this way be better adapted to its further requirements. At the same time, a cavity which can assume the function of an induction chamber is created as a result of a construction mode of this type.

It is furthermore provided that the cavity is configured in the region of the air inlet of the pressurized chamber, and it is provided in particular that the cavity is configured above the pressurized chamber, or above and behind the pressurized chamber, and it is provided in particular that the housing, in a region of the cavity which lies behind the pressurized chamber when viewed in the spraying direction, is configured with an air inlet mesh having air inlet slots. It is ensured as a result that the air inlet is positively supplied with air. It is guaranteed at the same time that the noise generated by the fan motor makes its way to the air inlet mesh only by way of a diversion, this already having a noise-damping effect.

It is also provided that an air filter is disposed between the pressurized chamber and the air inlet mesh. Apart from cleaning the inducted air, this air filter also has the effect of damping noise toward the user.

In the context of one example, a fan motor is a module which comprises an electric drive and a fan.

With reference to claim 1, an approximately orthogonal intersection of two planes in the context of one example is understood to mean that the planes intersect at an angle between 70° and 110°.

Further details of the present disclosure will be described in the drawing by means of a schematically illustrated exemplary embodiment. For the sake of clarity in the illustrations, any hatched representation of sectional faces has been dispensed with.

Shown in FIG. 1 in a partially sectional and partially schematic lateral view is a hand-held paint sprayer 1 according to one example, which is configured as a HLVP paint sprayer 2, specifically a high-volume low-pressure paint sprayer 2. The paint sprayer 1 comprises a housing 3 having a handle 4, a spray head 5, a receptacle space 6 which is disposed in the housing 3, and a fan motor 7 which is received in the receptacle space 6 (see FIG. 3). The receptacle space 6 comprises an air inlet 6*a* and an air outlet 6*b*.

Figure 2:
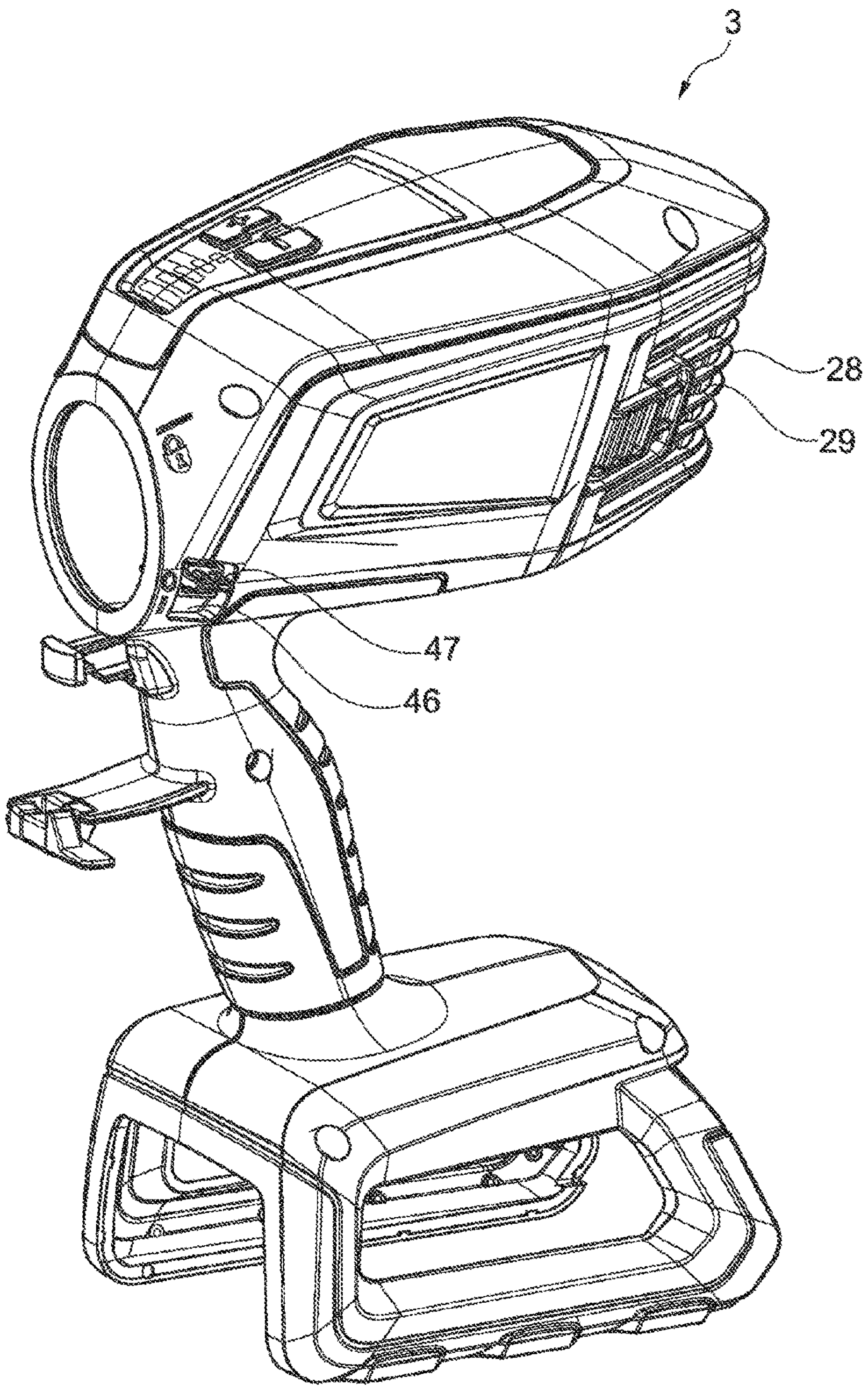
FIG. 2 shows a perspective view of the housing of the paint sprayer shown in FIG. 1.

Illustrated in FIG. 2 is a perspective view of the housing 3 of the paint sprayer 1 shown in FIG. 1.

Figure 3:
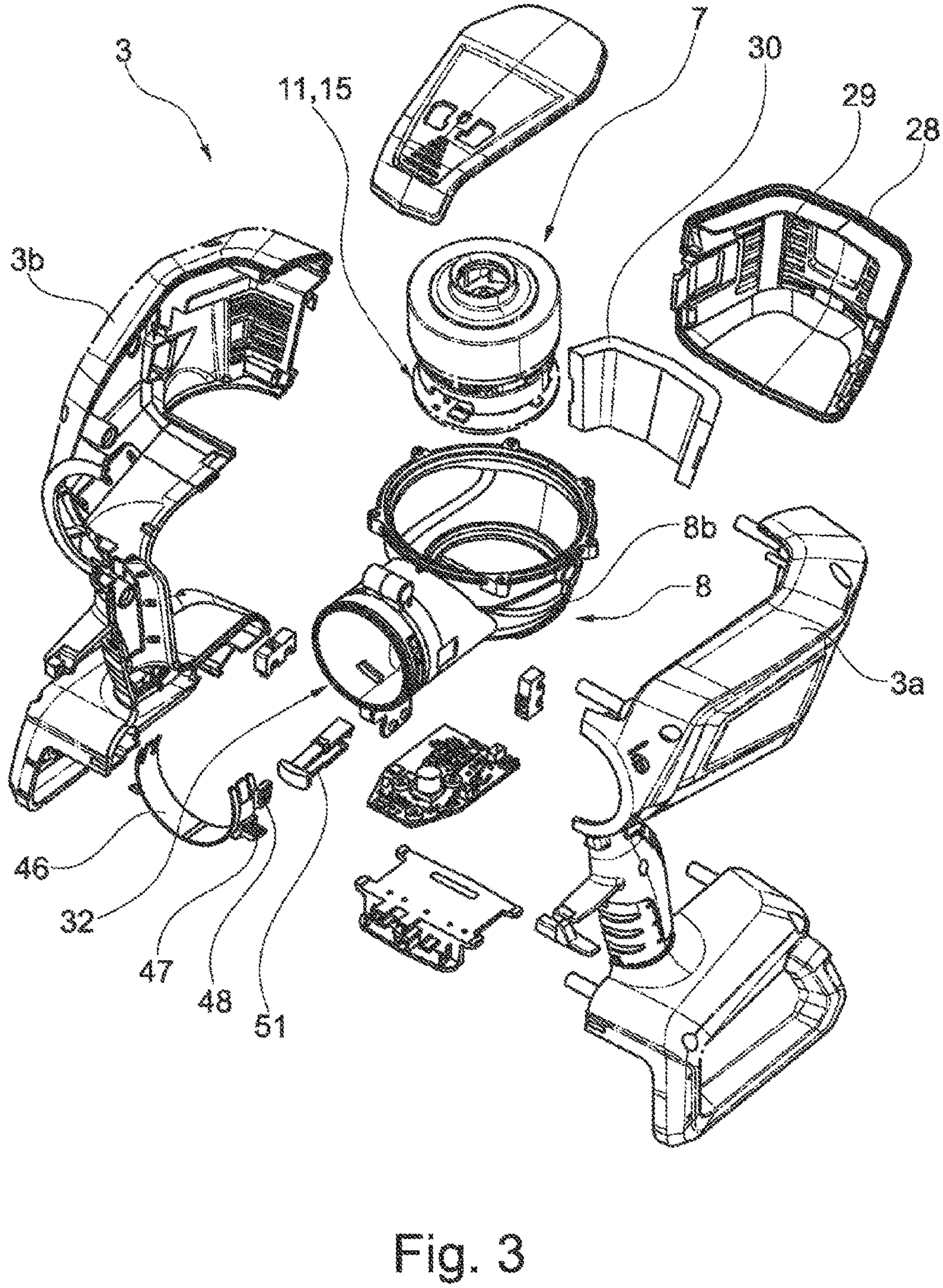
FIG. 3 shows an exploded view of the housing shown in FIG. 1, including components of the paint sprayer that are installed in the housing.

FIG. 3 shows an exploded view of the housing 3 shown in FIG. 2, including some of the components of the paint sprayer 1 which are installed in the housing 3, the fan motor 7 being one of these components, for example.

Figure 4:
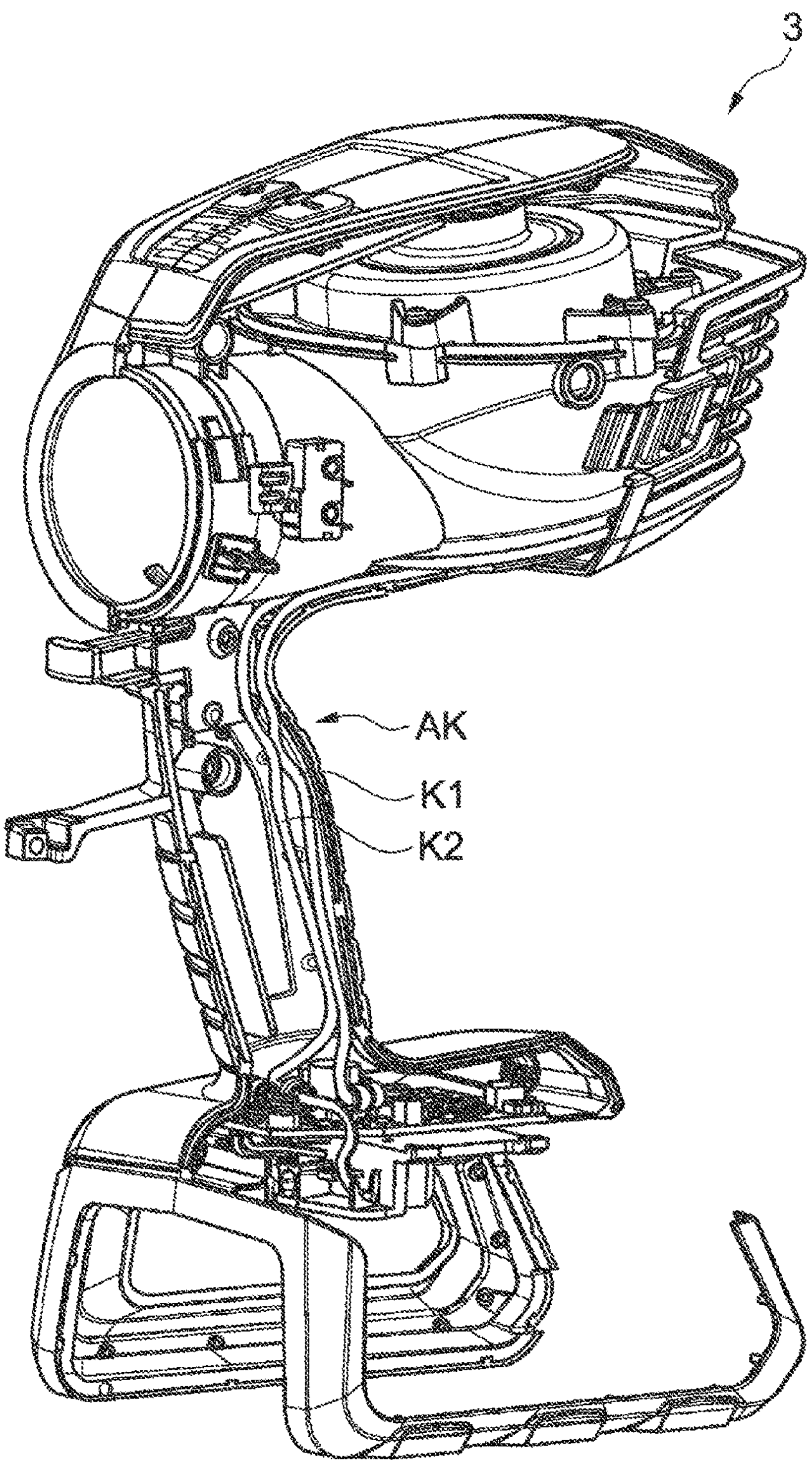
FIG. 4 shows a partially sectional view of the housing of the paint sprayer shown in FIG. 1.

FIG. 4 shows a partially sectional view of the housing 3 of the paint sprayer 1 shown in FIG. 1.

Figure 5:
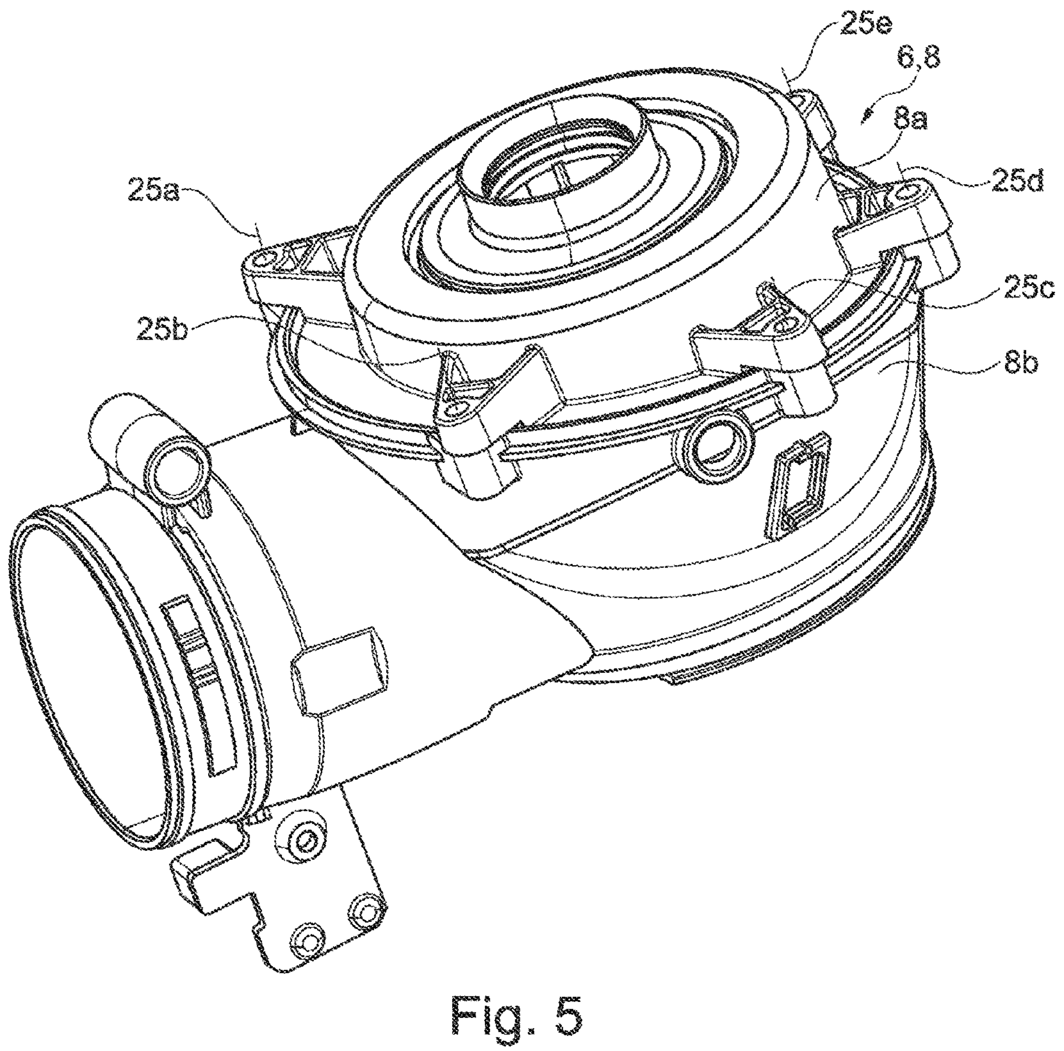
FIG. 5 shows a perspective view of the pressurized chamber installed in the housing, with an installed fan motor.
Figure 6:
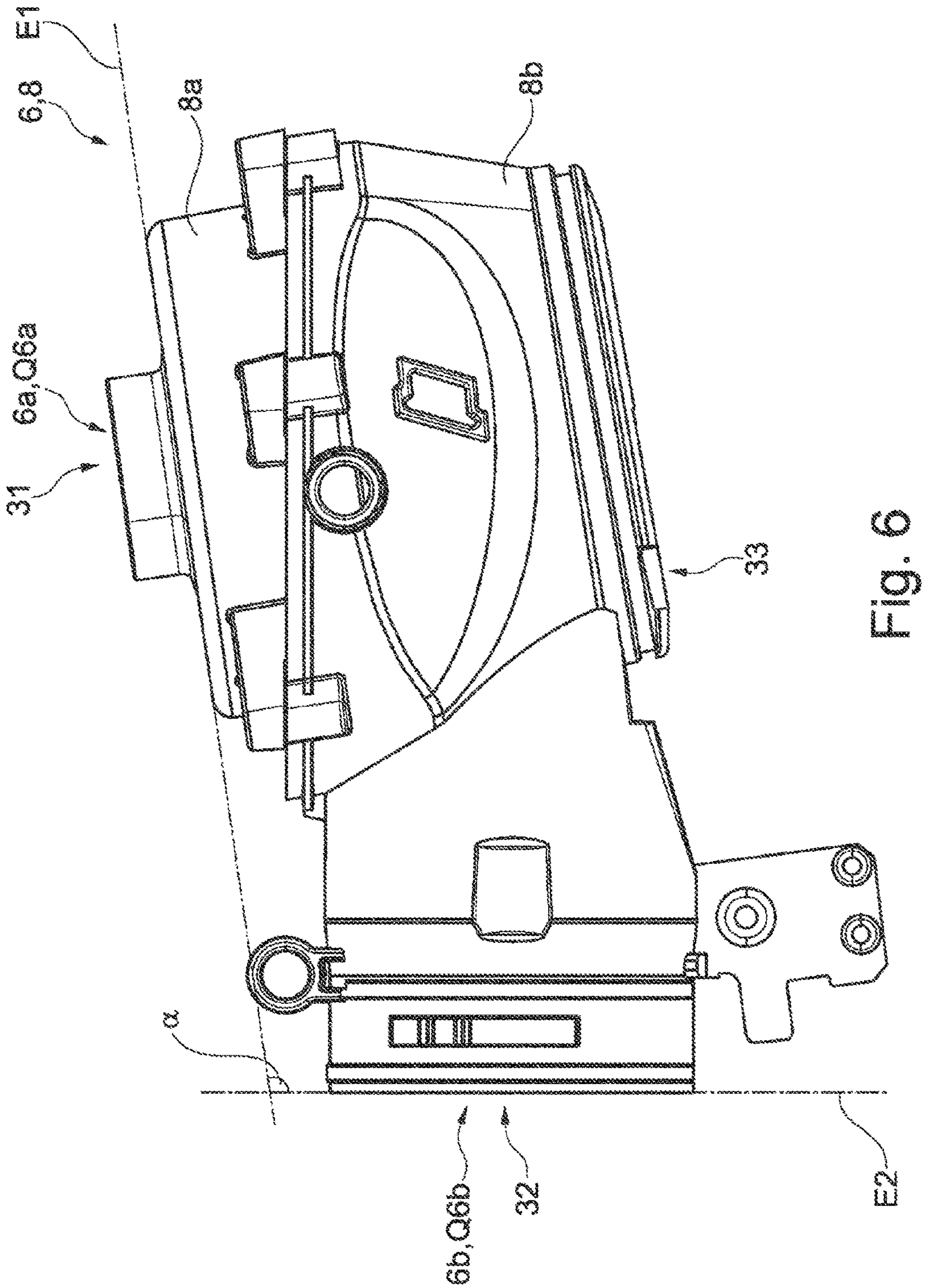
FIG. 6 shows a lateral view of the pressurized chamber installed in the housing, with an installed fan motor.

The receptacle space 5 is illustrated in a perspective view in FIG. 5, and illustrated in a lateral view in FIG. 6. The receptacle space 6 is configured as a pressurized chamber 8 and comprises an upper shell 8*a* and a lower shell 8*b*. Only the lower shell 8*b* is shown in the exploded view of FIG. 3.

Figure 7:
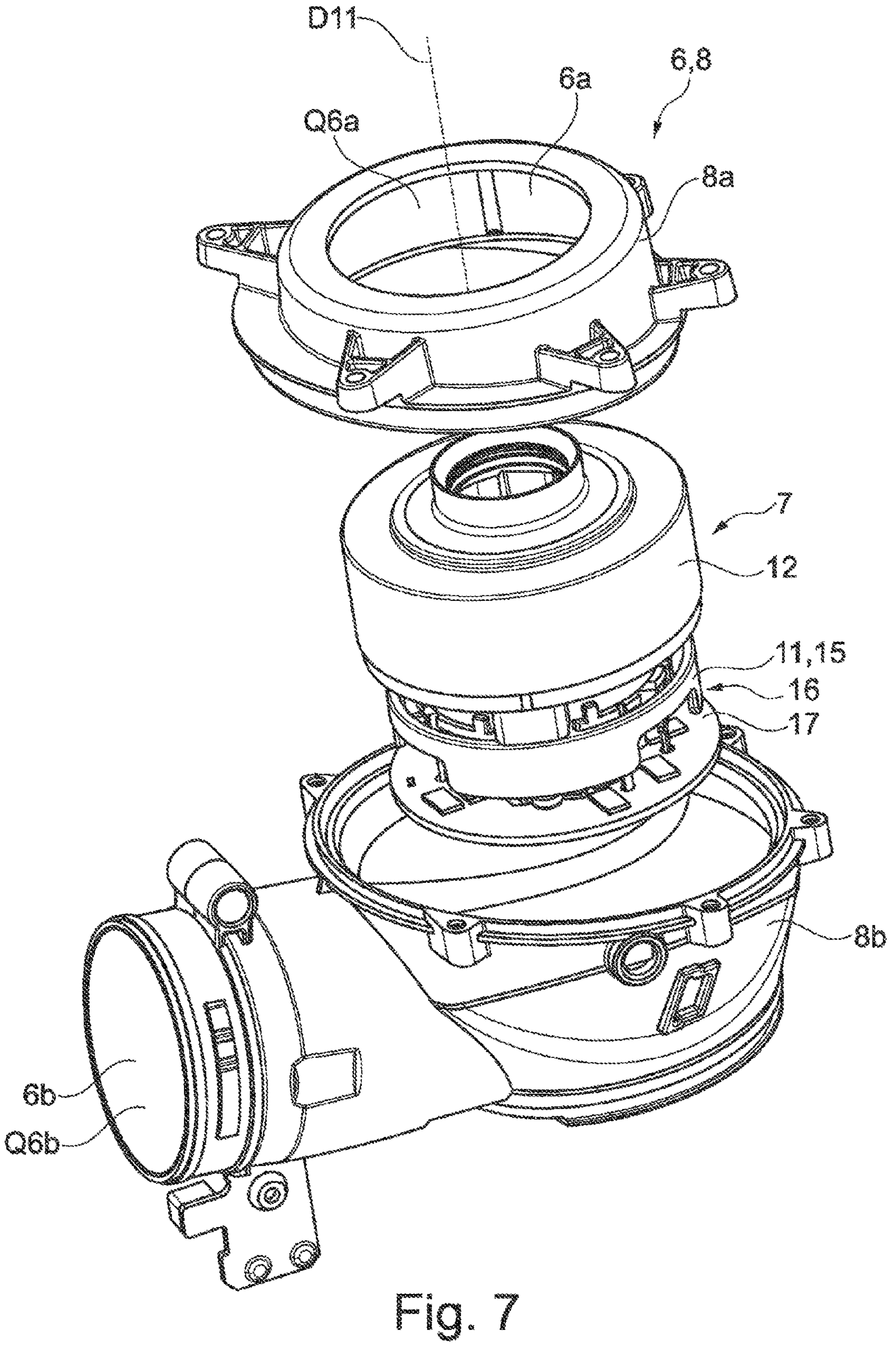
FIG. 7 shows an exploded view of the components shown in FIG. 5.

FIG. 7 shows an exploded view of the components shown in FIGS. 5 and 6, specifically of the upper shell 8*a* and the lower shell 8*b* of the pressurized chamber 8, the latter forming the receptacle space, and of the fan motor 7 received in the pressurized chamber 8.

As can be seen in particular from FIG. 6 in combination with FIG. 7, a first plane E1, in which lies a cross-sectional area Q6*a* of the air inlet 6*a*, and a second plane E2, in which lies a cross-sectional area Q6*b* of the air outlet 6*b*, intersect approximately orthogonally at an angle $\alpha$ of approximately 100°. The air outlet 6*b*, which is configured on the lower shell 8*b*, opens toward the spray head 5 (see FIG. 1). The fan motor 7 is received in the air inlet 6*a*.

As can be seen from FIG. 1, the spray head 5 of the paint sprayer 1 furthermore comprises a nozzle 9 and a container 10 for paint. The nozzle 9 is disposed opposite the air outlet 6*b*.

Figure 8:
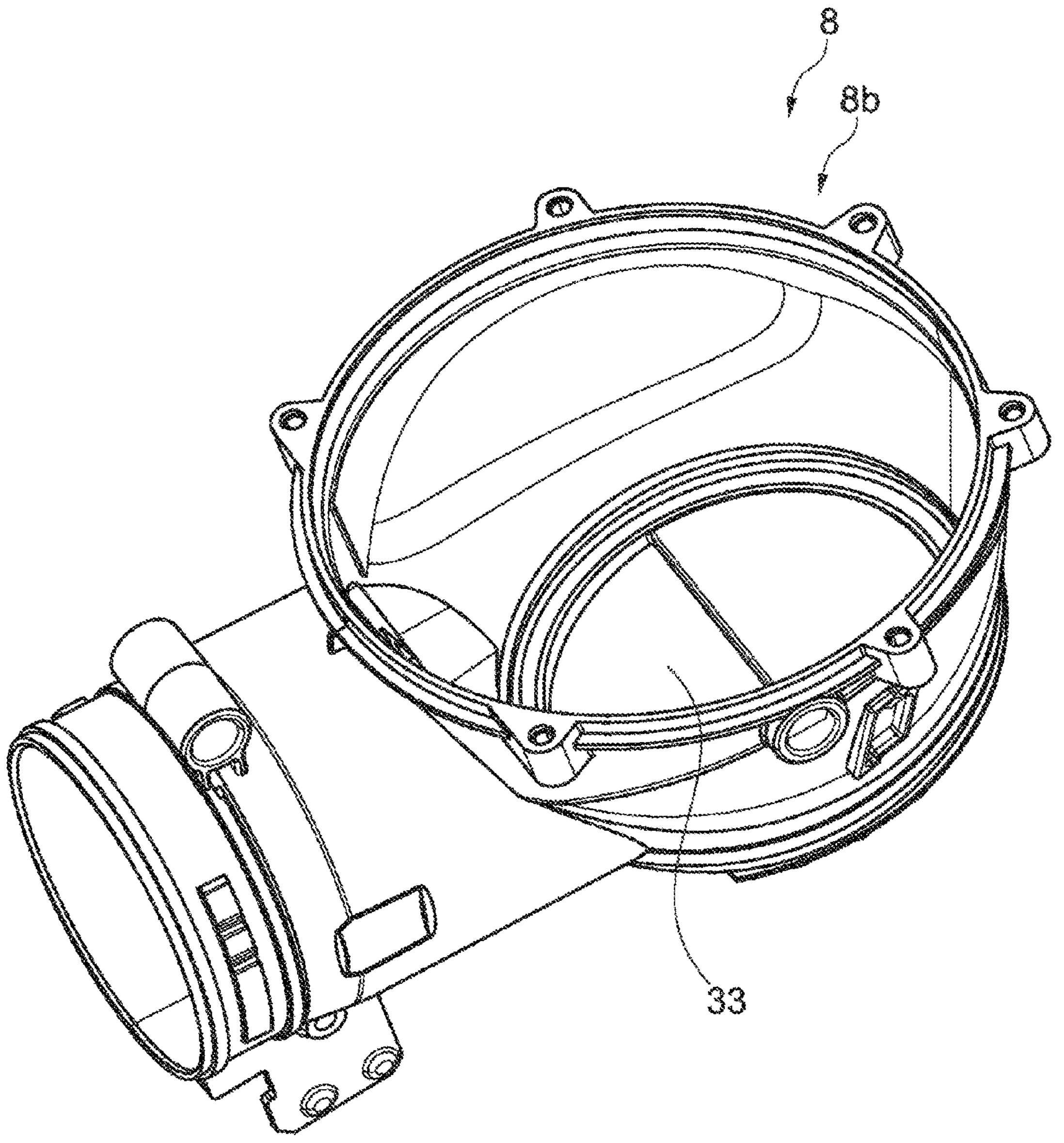
FIG. 8 shows a perspective view of the lower shell of the pressurized chamber.
Figure 9:
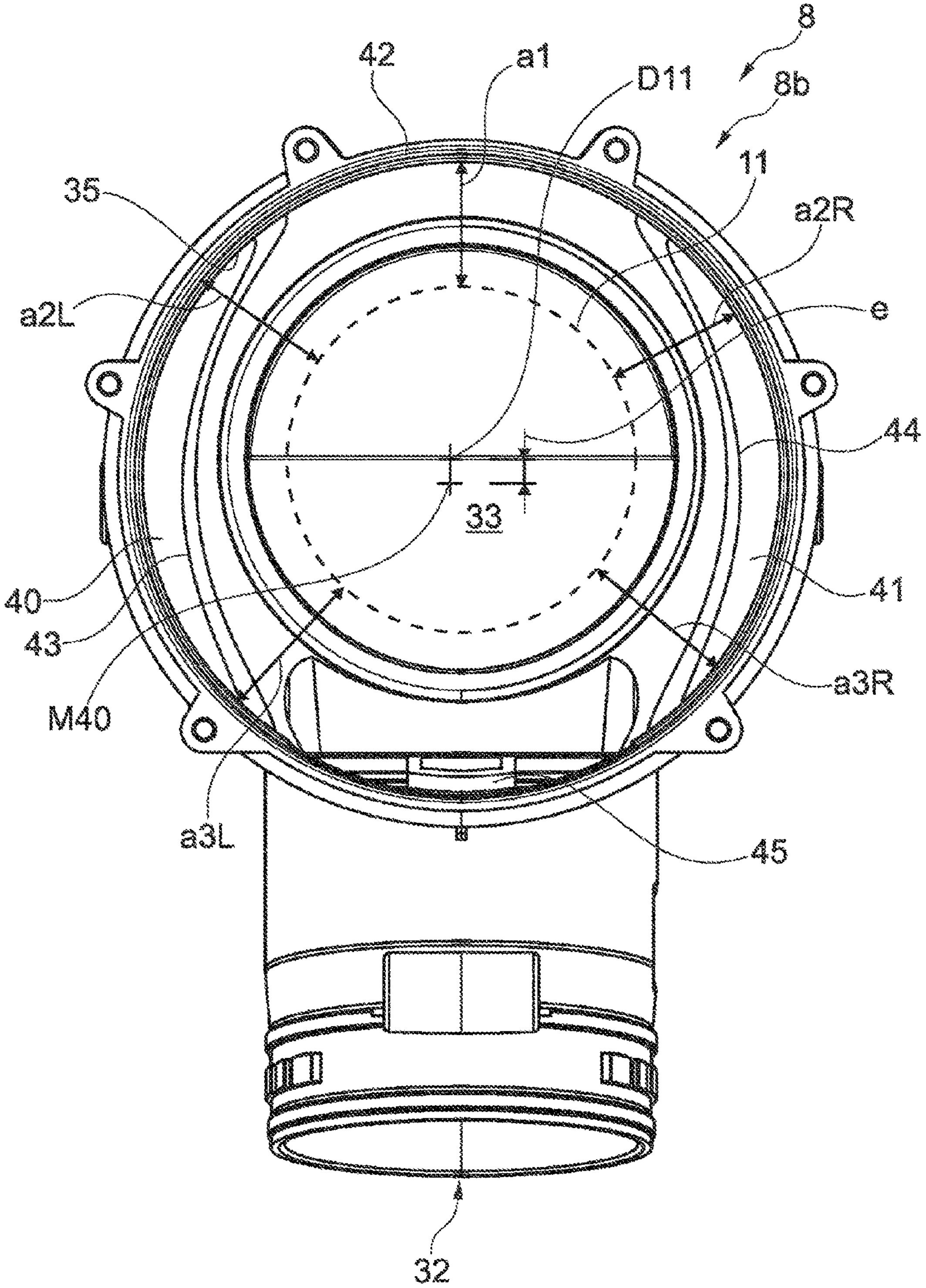
FIG. 9 shows a view from above of the lower shell of the pressurized chamber shown in FIG. 8.
Figure 10:
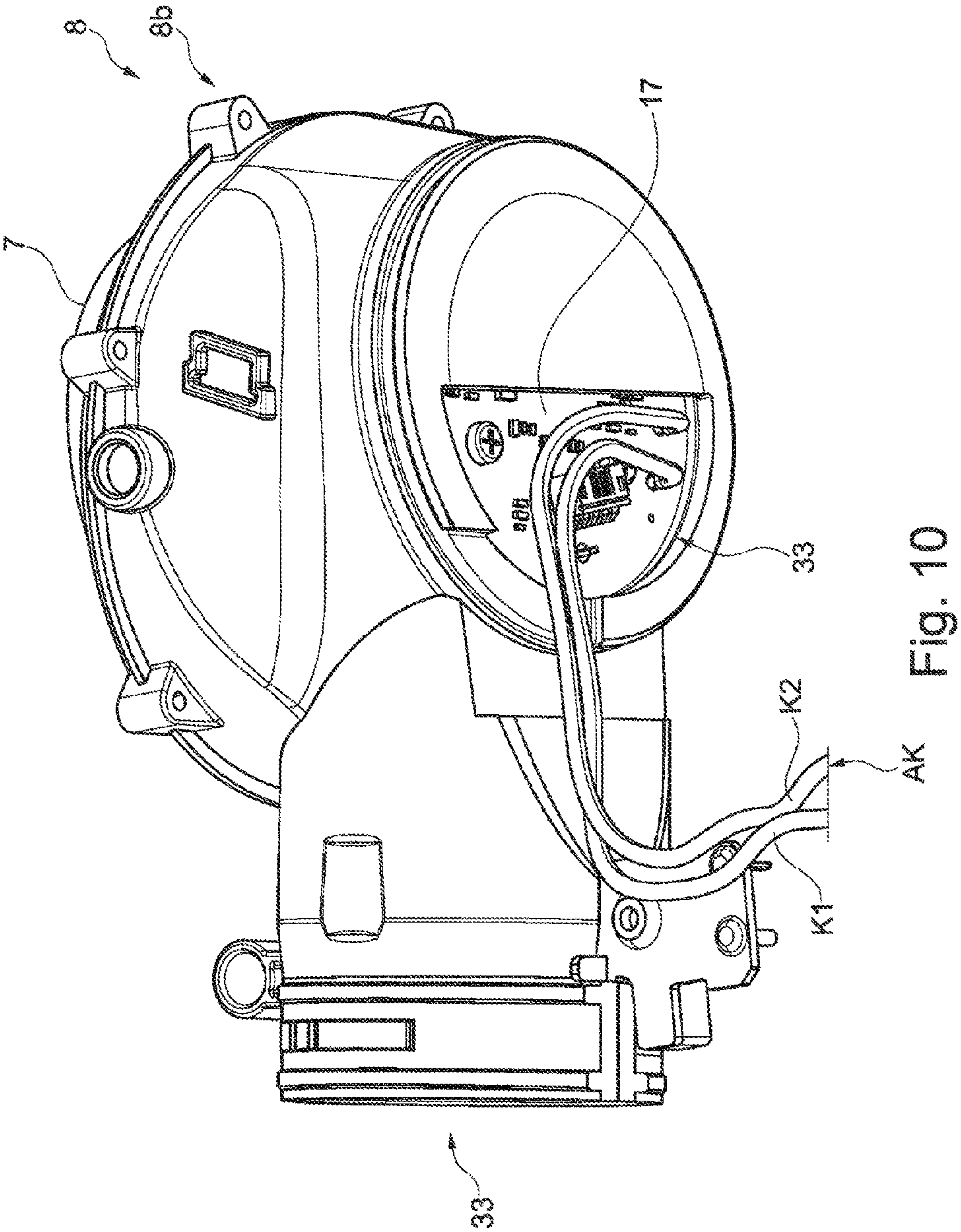
FIG. 10 shows a perspective view from below of the lower shell of the pressurized chamber shown in FIGS. 8 and 9, with an installed fan motor.
Figure 11:
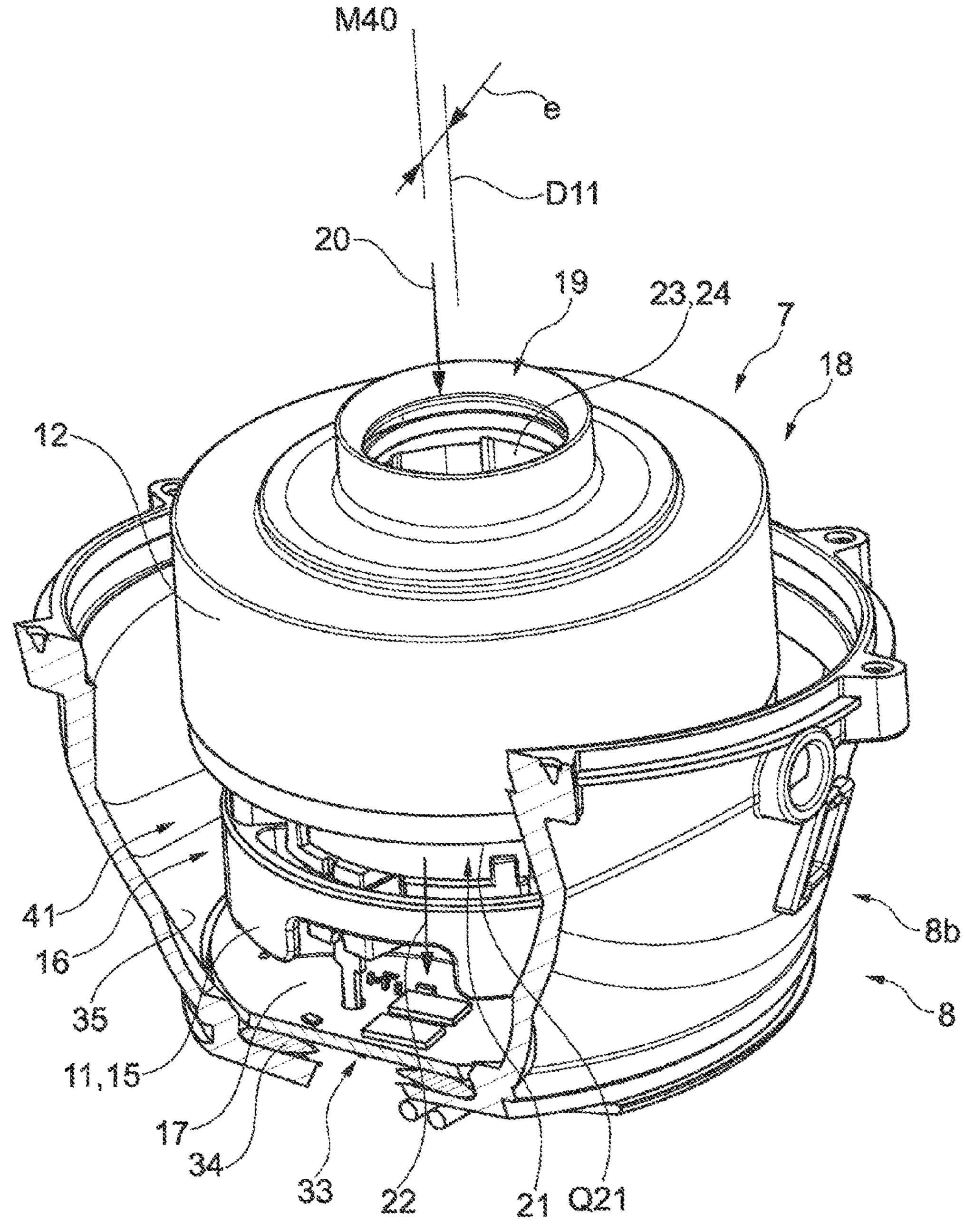
FIG. 11 shows a sectional perspective view of the lower shell of the pressurized chamber, with an installed fan motor.

FIG. 8 shows a perspective view of the lower shell 8*b* of the pressurized chamber 8. FIG. 9 shows a view from above of the lower shell 8*b* of the pressurized chamber 8 shown in FIG. 8. FIG. 10 shows a perspective view from below of the lower shell 8*b* of the pressurized chamber 8, shown in FIGS. 8 and 9, with an installed fan motor 7. FIG. 11 shows a sectional perspective view of the lower shell 8*b* of the pressurized chamber 8, with an installed fan motor 7.

The fan motor 7 comprises an electric drive 11 and a fan 2 (see FIGS. 7 and 11). The paint sprayer 1 (see FIG. 1) comprises a power accumulator 13 which is configured as an electric accumulator and from which the electric drive 11 is supplied. The handle 4, opposite the housing 3, comprises a coupling 14 for mechanically and electrically contacting the power accumulator 13. In this way, the paint sprayer 1 is configured as a rechargeable-battery operated HVLP paint sprayer.

The electric drive 11 (see in particular FIGS. 7 and 11) is configured as a BLDC electric drive 15 and comprises a control circuit board 17 which is connected to the motor housing 16 of said electric drive 11. The control circuit board 17, in terms of a rotation axis D11 of the electric drive 11, is disposed opposite the fan 12.

The fan 12 comprises a fan housing 18 (see in particular FIG. 11). During the operation of the paint sprayer 1, an intake duct 19 of the fan housing 18 is passed through by a flow of induction air 20 in the direction of the rotation axis D11 of the electric drive 11. The fan housing 18 furthermore comprises an exhaust duct 21. The exhaust duct 21 has an annular cross section Q21. During the operation of the paint sprayer 1, the latter is passed through by a flow of exhaust air 22 in the direction of the rotation axis D11 of the electric drive 11. The fan 12 furthermore comprises a fan wheel 23 which is received in the fan housing 18 and is driven by the electric drive 11. The fan wheel 23 is configured as a radial fan wheel 24.

The pressurized chamber 8 is received in an interior space 26 of the housing 3, wherein a cavity 27 is configured between the pressurized chamber 8 and the housing 3 (see in particular FIG. 1).

The cavity 27 herein is embodied in the region of the air inlet 6*a* of the receptacle space 6 configured as the pressurized chamber 8. The cavity 27 mentioned is configured above the pressurized chamber 8 and—when viewed in a spray direction x of the paint sprayer 1—behind the pressurized chamber 8 (see in particular FIG. 1). Furthermore, the housing 3, in a region of the cavity 27 lying behind the pressurized chamber 8, comprises an air inlet mesh 28 having air inlet slots 29 which are denoted only by way of example. An air filter 30, which partially fills that part of the cavity 27 that lies behind the pressurized chamber, is disposed between the pressurized chamber 8 and the air inlet mesh 28 (see FIGS. 1 and 3).

The pressurized chamber 8, in addition to a first opening 31 formed by the air inlet 6*a* and a second opening 32 formed by the air outlet 6*b*, comprises a third opening 33 which is disposed opposite the first opening 31 (see in particular FIGS. 6, 8 to 11).

In the case of an installed fan motor 7, the third opening 33 is closed by the control circuit board 17 (see FIGS. 10 and 11). In order to achieve an airtight closure of the third opening 33, the pressurized chamber 8 comprises a seal ring 34 which can be seen having two sectional faces in FIG. 11. The seal ring 34 is disposed on an internal side 35 of the pressurized chamber 8 in such a manner that said seal ring 35 encircles the third opening 33.

The fan motor 7, conjointly with the control circuit board 17 fastened thereto, is installed in an interior space 36 of the pressurized chamber 8 in such a manner that the control circuit board 17 bears on the seal ring 34 and as a result closes the third opening 33 in a sealing manner. The control circuit board 17 comprises a connecting cable 37 which is routed via the third opening 33 into the handle 4.

The pressurized chamber 8 is configured in two parts, wherein an upper shell 38 of the pressurized chamber 8 receives in a form-fitting manner the fan housing 18 and is screwed to a lower shell 39 of the pressurized chamber 8 in such a manner that the control circuit board 17 is pressed against the seal ring 34 in the region of the third opening 33 (see in particular FIGS. 5 and 7). The screws 25*a* to 25*e* used in the screw connection are in part symbolically indicated by lines in FIG. 5.

The fan motor 7, or the electric drive 11, by way of its rotation axis D11, is aligned eccentrically, by an eccentricity e, to a central axis M40 of a motor receptacle region 40 of the pressurized chamber 8. This can be seen in FIG. 9, which shows a view from above of the lower shell 8*b* of the pressurized chamber 8, and in which the rotation axis D11 and the central axis M40 are plotted. The eccentricity e is also indicated in FIG. 11.

A flow chamber 41 is configured below the fan 12, above the control circuit board 17 between the electric drive 11—schematically indicated by dashed lines in FIG. 9—and the internal side 35 of the pressurized chamber 8. A spacing measured radially to the rotation axis D11 of the electric drive 11 between the electric drive 11 and the internal side 35 of the pressurized chamber 8, proceeding from a rear wall 42 opposite the second opening 32 of the pressurized chamber 8, increases on both sides of the electric drive 11, from a value a1 to values a2R, a3R and a2L and a3L, in such a manner that the flow chamber 41 toward the second opening 32 is configured as a first flow duct 43, which widens on a left side of the electric drive 11, and as a second flow duct 44, which widens on a right side of the electric drive 11, for air conveyed by the fan 12. The left flow duct 43 and the right flow duct 44 transition into a collective duct 45 which leads to the second opening 32. The collective duct 45 herein is configured in the pressurized chamber 8.

A longitudinal axis L4, which is defined by the handle 4, and the rotation axis D11 of the fan motor 7 are aligned so as to be approximately parallel to one another (see FIG. 1).

The third opening 33 of the pressurized chamber 8 is configured as an opening which is semicircular in the cross section (see in particular FIG. 10). Accordingly, the control circuit board is accessible via the third opening 33 only in a region close to the second opening 32, and otherwise protected by the pressurized chamber 8. It is avoided as a result that a user who removes the air inlet mesh 28 in order to replace the air filter 30 can inadvertently touch the control circuit board 17 (see in particular FIG. 3 in this respect).

It can furthermore be seen in FIG. 10 that the fan motor 7 is provided with an electric current via the third opening 33 of the pressure chamber 8. By way of example, a connecting cable AK having two lines K1, K2 is shown, these latter being connected at the control circuit board 17. The connecting cable AK is routed through the handle 4. The installation of the complete fan motor 7 is performed in such a manner that the fan motor 7, with the control circuit board 17 ahead, is placed into the lower shell 8*b*, the control circuit board 17 herein bearing on the seal ring 34, which is preassembled in the lower shell 8*b*, and the upper shell 8*a* then being placed onto the fan 12 of the fan motor 7 and screwed to the lower shell 8*b*. In the process, the fan motor 7 is aligned in the pressurized chamber 8 by the fan 12 which partially plunges through the upper shell 8*a*, and by the control circuit board 17 which is received in a form-fitting manner in the lower shell 8*b*.

Figure 12:
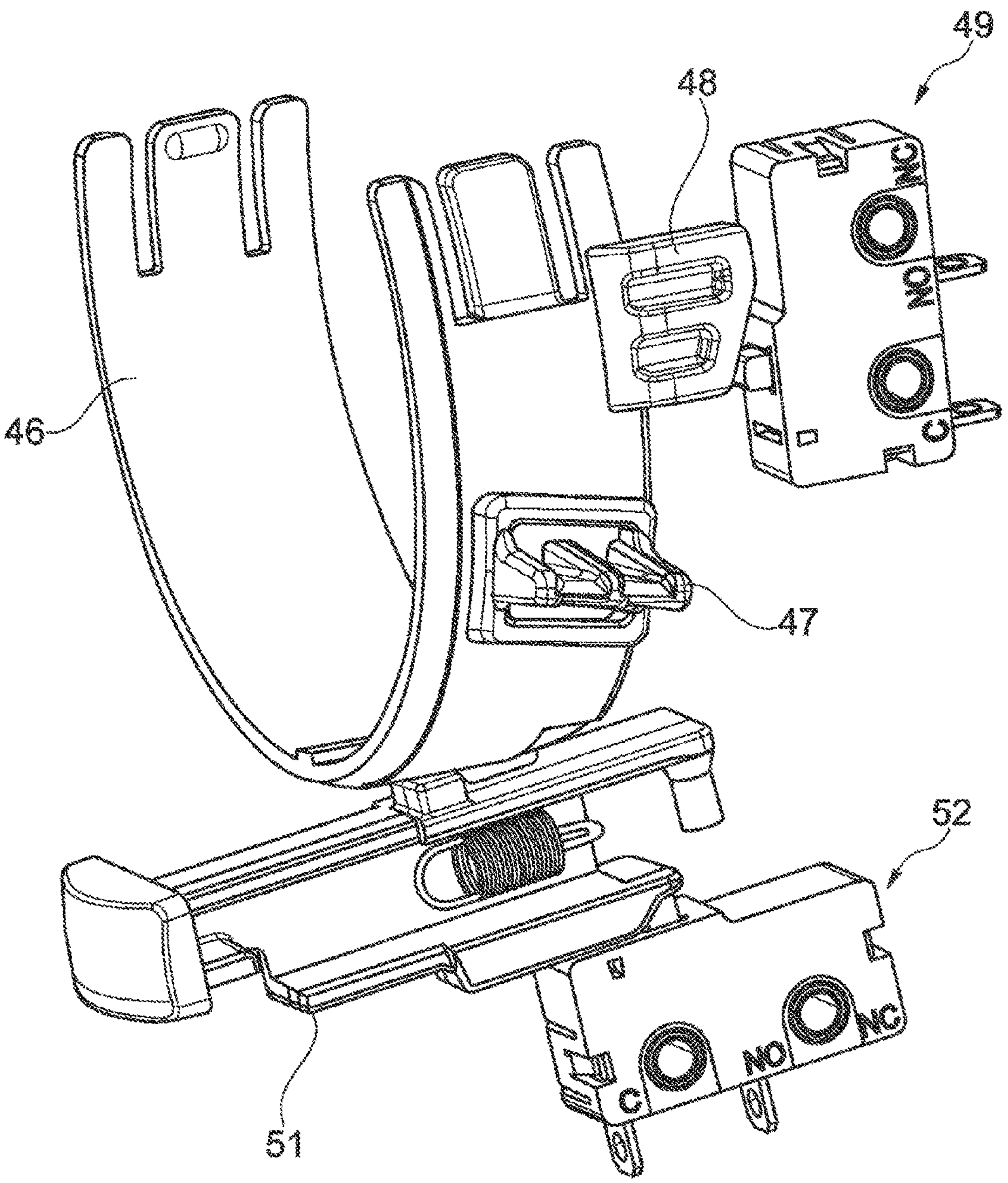
FIG. 12 shows an enlarged stand-alone view of individual components shown in FIG. 4.

An enlarged stand-alone view of individual components shown in FIG. 4 is illustrated in FIG. 12. The paint sprayer 1 comprises an activation ring 46 which sits on the pressurized chamber 8 in the region of the second opening 32, as is derived from FIG. 3, and is rotatably received between the pressurized chamber 8 and lateral shells 3*a*, 3*b* of the housing 3. The activation ring 46 comprises an activation element 47 and a cam 48. The activation ring 46 by way of the activation element 47 can be rotated in such a manner that an electric push button 49 installed on the housing 3 is activated by the cam 49. A supply of current to the control circuit board 17 takes place by way of the electric push button 49 so that the control circuit board 17 goes to a standby mode as soon as the push button 49 is activated, in which standby mode a quasi-immediate start-up of the BLDC electric drive 15 is possible when the nozzle 9 is opened by way of a trigger 50 (see FIG. 1) and a slide 51 moved by the latter, and a second electric push button 52 is activated by way of which a "motor ON" signal is sent to the control circuit board 17. The "motor ON" signal herein can be implemented by the control circuit board 17 only when the first push button 49 is activated; otherwise there is no activation of the electric drive 11. In this way, a current consumption can be completely avoided when the paint sprayer 1 is not in use, and a rapid start-up of the fan motor 7 can be guaranteed at the same time, so that any formation of droplets on the nozzle at the beginning of the spraying action is reliably avoided.

Although the present invention has been described with reference to preferred embodiments, workers skilled in the art will recognize that changes may be made in form and detail without departing from the spirit and scope of the invention.

LIST OF REFERENCE SIGNS

1 Hand-held paint sprayer
2 HVLP paint sprayer
3 Housing
3*a*, 3*b* Lateral shell of 3
4 Handle
5 Spray head
6 Receptacle space
7 Fan motor
6*a* Air inlet
6*b* Air outlet
8 Pressurized chamber
8*a* Upper shell
8*b* Lower shell
9 Nozzle
10 Container
11 Electric drive
12 Fan
13 Power accumulator
14 Coupling
15 BLDC electric drive
16 Motor housing of 11
17 Control circuit board
18 Fan housing
19 Intake duct of 18
20 Induction air
21 Exhaust duct of 18
22 Exhaust air
23 Fan wheel of 18
24 Radial fan wheel
25*a*-25*e* Screw of 8
26 Interior space of 3
27 Cavity between 25 and 3
28 Air inlet mesh
29 Air inlet slot
30 Air filter
31 First opening of 8
32 Second opening of 8
33 Third opening of 8
34 Seal ring of 8
35 Internal sides of 8
36 Interior space of 8
37 Connecting cable of 17
38 Upper shell of 25
39 Lower shell of 25
40 Motor receptacle region of 25
41 Flow chamber
42 Rear wall of 8, opposite 32
43 First, left flow duct
44 Second, right flow duct
45 Collective duct
46 Activation ring
47 Activation element
48 Cam
49 First electric push button
50 Trigger
51 Slide
52 Second electric push button
α Angle α
a1 Spacing
a2L, a3L Spacings in the left flow duct 43
a2R, a3R Spacings in the right flow duct 44
AK Connecting cable
D11 Rotation axis of 11
E1 First plane
E2 Second plane
K1, K2 Line
L4 Longitudinal axis of 4
M40 Central axis of 40
Q6*a* Cross-sectional area Q6*a* of the air inlet 6*a*
Q6*b* Cross-sectional area Q6*b* of the air outlet 6*b*
Q21 Cross section of 21
x Spraying direction
e Eccentricity

The invention claimed is:

1. A hand-held paint sprayer comprising:
a housing having a handle;
a spray head;
a fan motor;
a control circuit board; and
a pressurized chamber disposed within the housing, the pressurized chamber having a receptacle space formed therein;
wherein the receptacle space receives at least a portion of the fan motor;
wherein the pressurized chamber comprises an air inlet defining a first air flow axis and an air outlet defining a second air flow axis;
wherein the first air flow axis and the second air flow axis intersect approximately orthogonally;
wherein the control circuit board is disposed in an aperture of the pressurized chamber;
wherein the pressurized chamber comprises a seal ring, and wherein the seal ring is disposed on an internal side of the pressurized chamber such that the seal ring encircles the aperture; and
wherein the fan motor, conjointly with the control circuit board fastened thereto, is installed in an interior space of the pressurized chamber such that the control circuit board bears on the seal ring and closes the aperture in a sealing manner, wherein the control circuit board comprises a connecting cable which is routed via the aperture into the handle.

2. The hand-held paint sprayer as claimed in claim 1, wherein the air inlet includes a first plane defining a cross sectional area of the air inlet, the first plane and the first air flow axis intersect approximately orthogonally, and wherein the air outlet includes a second plane defining a cross sectional area of the air outlet, the second plane and the second air flow axis intersect approximately orthogonally.

3. The hand-held paint sprayer as claimed in claim 1, wherein the pressurized chamber includes an upper shell and a lower shell, wherein the upper shell receives, in a form-fitting manner, a fan housing, and wherein the upper shell is screwed to the lower shell such that the control circuit board is pressed against the seal ring.

4. The hand-held paint sprayer as claimed in claim 1, wherein a rotation axis of the fan motor is aligned eccentrically to a central axis of a motor receptacle region of the pressurized chamber.

5. The hand-held paint sprayer as claimed in claim 1, wherein the fan motor comprises an electric drive and a fan, wherein a flow chamber is positioned below the fan between the electric drive and an internal side of the pressurized chamber, wherein a spacing, measured radially to an rotation axis of the electric drive between the electric drive and the internal side of the pressurized chamber, proceeding from a rear wall opposite the air outlet of the pressurized chamber, increases on both sides of the electric drive such that the flow chamber forms a first flow duct, which widens on a first side of the electric drive, and as a second flow duct, which widens on a second side of the electric drive, for air conveyed by the fan, and wherein the first flow duct and the second flow duct transition into a collective duct which leads to the air outlet.

6. The hand-held paint sprayer as claimed in claim 1, wherein a longitudinal axis, defined by the handle, and a rotation axis of the fan motor are aligned approximately parallel to one another.

7. The hand-held paint sprayer as claimed in claim 1, and further comprising:
- a third opening positioned opposite to the air inlet relative to the pressurized chamber, wherein the third opening is an opening which is semicircular in a cross section.

8. The hand-held paint sprayer as claimed in claim 1, wherein:
- the fan motor comprises an electric drive and a fan;
- the paint sprayer comprises a power accumulator;
- the handle comprises a coupling for mechanically and electrically coupling the power accumulator; and
- the handle has a first end and a second end, the first end being connected to the housing and the second end being connected to the coupling.

9. The hand-held paint sprayer as claimed in claim 8, wherein:
- the electric drive is configured as a BLDC electric drive and comprises the control circuit board;
- wherein the control circuit board is disposed between the fan and the first end of the handle.

10. The hand-held paint sprayer as claimed in claim 9, wherein:
- the fan, driven by the electric drive, comprises a fan housing having an intake duct and an exhaust duct;
- a flow of induction air passes through the intake duct in a direction of a rotation axis of the electric drive;
- a flow of exhaust air passes through the exhaust duct in the direction of the rotation axis of the electric drive;
- the fan housing has an annular cross section; and
- the fan comprises a radial fan wheel which is received in the fan housing.

11. The hand-held paint sprayer as claimed in claim 1, wherein the pressurized chamber is received in an interior space of the housing, and wherein a cavity is formed between the pressurized chamber and the housing.

12. The hand-held paint sprayer as claimed in claim 1, wherein a cavity is formed as a region of the air inlet of the pressurized chamber, wherein the cavity is positioned above the pressurized chamber, or above and behind the pressurized chamber, and wherein the housing, in a region of the cavity which lies behind the pressurized chamber when viewed in the spraying direction, comprises an air inlet mesh having air inlet slots.

13. The hand-held paint sprayer as claimed in claim 12, wherein an air filter is disposed between the pressurized chamber and the air inlet mesh.

14. The hand-held paint sprayer as claimed in claim 1, wherein the control circuit board is connected to a motor housing of an electric drive of the fan motor.

15. A hand-held paint sprayer comprising:
- a housing having a handle;
- a spray head;
- a fan motor;
- a control circuit board; and
- a pressurized chamber disposed within the housing, the pressurized chamber having a receptacle space formed therein;
- wherein the receptacle space receives at least a portion of the fan motor;
- wherein the pressurized chamber comprises an air inlet defining a first air flow axis and an air outlet defining a second air flow axis;
- wherein the first air flow axis and the second air flow axis intersect approximately orthogonally; and
- wherein the fan motor comprises an electric drive and a fan, wherein a flow chamber is positioned below the fan between the electric drive and an internal side of the pressurized chamber, wherein a spacing, measured radially to an rotation axis of the electric drive between the electric drive and the internal side of the pressurized chamber, proceeding from a rear wall opposite the air outlet of the pressurized chamber, increases on both sides of the electric drive such that the flow chamber forms a first flow duct, which widens on a first side of the electric drive, and as a second flow duct, which widens on a second side of the electric drive, for air conveyed by the fan, and wherein the first flow duct and the second flow duct transition into a collective duct which leads to the air outlet.

16. A hand-held paint sprayer comprising:
- a housing having a handle;
- a spray head;
- a fan motor;
- a control circuit board;
- a pressurized chamber disposed within the housing, the pressurized chamber having:
  - a receptacle space formed therein, wherein the receptacle space receives at least a portion of the fan motor;
  - an air inlet defining a first air flow axis; and
  - an air outlet defining a second air flow axis, wherein the first air flow axis and the second air flow axis intersect approximately orthogonally; and
- a third opening positioned opposite to the air inlet relative to the pressurized chamber, wherein the third opening is an opening which is semi-circular in a cross section.

* * * * *